United States Patent
Kalra

(10) Patent No.: US 7,584,090 B1
(45) Date of Patent: Sep. 1, 2009

(54) TEXT CREATING AND EDITING SYSTEM AND METHOD WITH DYNAMIC DATA LOADING

(75) Inventor: Devendra Kalra, Fremont, CA (US)

(73) Assignee: VeriSign, Inc., Mountain View, CA (US)

( * ) Notice: Subject to any disclaimer, the term of this patent is extended or adjusted under 35 U.S.C. 154(b) by 1667 days.

(21) Appl. No.: 09/707,309

(22) Filed: Nov. 6, 2000

(51) Int. Cl.
*G06F 17/28* (2006.01)

(52) U.S. Cl. .............................. 704/8; 704/7
(58) Field of Classification Search ........ 704/2, 704/4, 5, 3, 7, 8
See application file for complete search history.

(56) References Cited

U.S. PATENT DOCUMENTS

| | | | | |
|---|---|---|---|---|
| 5,092,686 A | * | 3/1992 | Tsukamoto | 400/692 |
| 5,423,948 A | * | 6/1995 | Graf et al. | 162/342 |
| 5,646,840 A | * | 7/1997 | Yamauchi et al. | 704/2 |
| 5,781,714 A | * | 7/1998 | Collins et al. | 345/471 |
| 5,940,581 A | * | 8/1999 | Lipton | 358/1.11 |
| 6,073,148 A | * | 6/2000 | Rowe et al. | 707/102 |
| 6,381,567 B1 | * | 4/2002 | Christensen et al. | 704/8 |
| 6,498,657 B1 | * | 12/2002 | Kuntz et al. | 358/1.1 |
| 6,623,529 B1 | * | 9/2003 | Lakritz | 715/536 |

* cited by examiner

*Primary Examiner*—Talivaldis Ivars Smits
*Assistant Examiner*—Thomas E. Shortledge
(74) *Attorney, Agent, or Firm*—Townsend and Townsend and Crew LLP

(57) ABSTRACT

The present invention is directed to a system and method for creating and editing documents or messages by dynamically loading the required data on the computing device as the documents or messages are being created or edited. This invention has relevance for creating or editing documents or messages in non-English languages using a computing device that is pre-configured to create English documents or messages, but not non-English documents or messages. Further, the present invention allows a user to create and edit documents and messages on a computing device that may not have been configured a priori or have limited storage capability to support the entire data set required for creating the documents or messages in a specific language. The computing device is required to communicate with a data storage device to dynamically load the required data from therein.

19 Claims, 7 Drawing Sheets

TEXT CREATING AND EDITING SYSTEM AND METHOD WITH DYNAMIC DATA LOADING

FIELD OF THE INVENTION

The present invention relates to a system and method for creating and editing documents or messages on computing devices. More particularly, the present invention is directed to a system and method for creating and editing documents or messages by dynamically loading the required data on the computing device as the documents or messages are being created or edited. The present invention has particular relevance for creating or editing documents or messages in non-English languages using a computing device that is pre-configured to create English documents or messages, but not non-English documents or messages.

BACKGROUND OF THE INVENTION

Computing devices such as personal computers, laptop computers, personal digital assistants (PDAs), pagers, cellular phones, Net appliances and the like are commonly used to create and edit documents and messages. Creating documents and messages on a computing device typically requires the user to input the text using an input device (e.g., keyboard, pointing device, mouse, voice) that is associated with the computing device. The inputted text is then displayed on a screen or monitor for providing user feedback.

The creating and editing processes require mapping the input (e.g., a key on a keyboard) to a glyph or a displayable form. For example, in a conventional computer system using English alphabets/characters, when the user types the key such as the letter "A" on the keyboard, a code such as "65" is sent to the computing device. The computing device converts or maps the code "65" into the glyph or the displayable form of "A" and renders it on the screen or monitor.

The computing device requires both the mapping and displaying mechanisms. The mapping mechanism maps the keyboard input into the glyph or displayable form, and the displaying mechanism uses the glyph or font to represent the characters in the document or message. The mapping mechanism and a set of glyphs or font are generally installed on the computing device before performing the document creating/editing processes. For example, in the personal computer, an application for performing mapping and the font in the language that the user desires to use are generally installed by the user on the computer. In other devices such as pagers, the application and the font are permanently pre-installed therein.

In some cases, the application and/or the font are not installed on computing devices because of their design characteristics and/or limited memory capacity. In this case, the user cannot use such devices to create documents or messages. One such example is a computing device that is designed for an English-speaking user and the user desires to create a document using a non-English language such as Chinese.

As described above, conventional text creating/editing systems and methods have many limitations and shortcomings due to the design characteristics or limited memory capacity of computing devices. Accordingly, there is a need for a text creating/editing system and method for overcoming the above-described problems. There is also a need for a system and method that allows a computing device to dynamically configure itself so that it can be used for creating/editing documents regardless of its design characteristics or memory capacity.

SUMMARY OF THE INVENTION

In view of the above-described problems of the prior art, it is an object of the present invention to provide a system and method for enabling users to create documents and messages in any language using any computing device that is capable of communicating with a data storage device.

It is another object of the present invention to provide a system and method for creating documents and messages by dynamically loading the required data on the computing device as the documents or messages are being created or edited.

It is a further object of the present invention to provide a system and method for creating documents and messages on a computing device in any language regardless of whether the computing device has been pre-configured to support the desired language.

It is still another object of the present invention to provide a system and method for creating documents and messages on a computing device that has limited memory capacity.

It is yet a further object of the present invention to provide a system and method for creating documents and messages on a computing device that does not have an associated input device that can generate the codes corresponding to the characters of the language.

These and other objects of the present invention are obtained by providing a system and method using a computing device that can map the input modality of the device into language specific codes using an algorithm.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
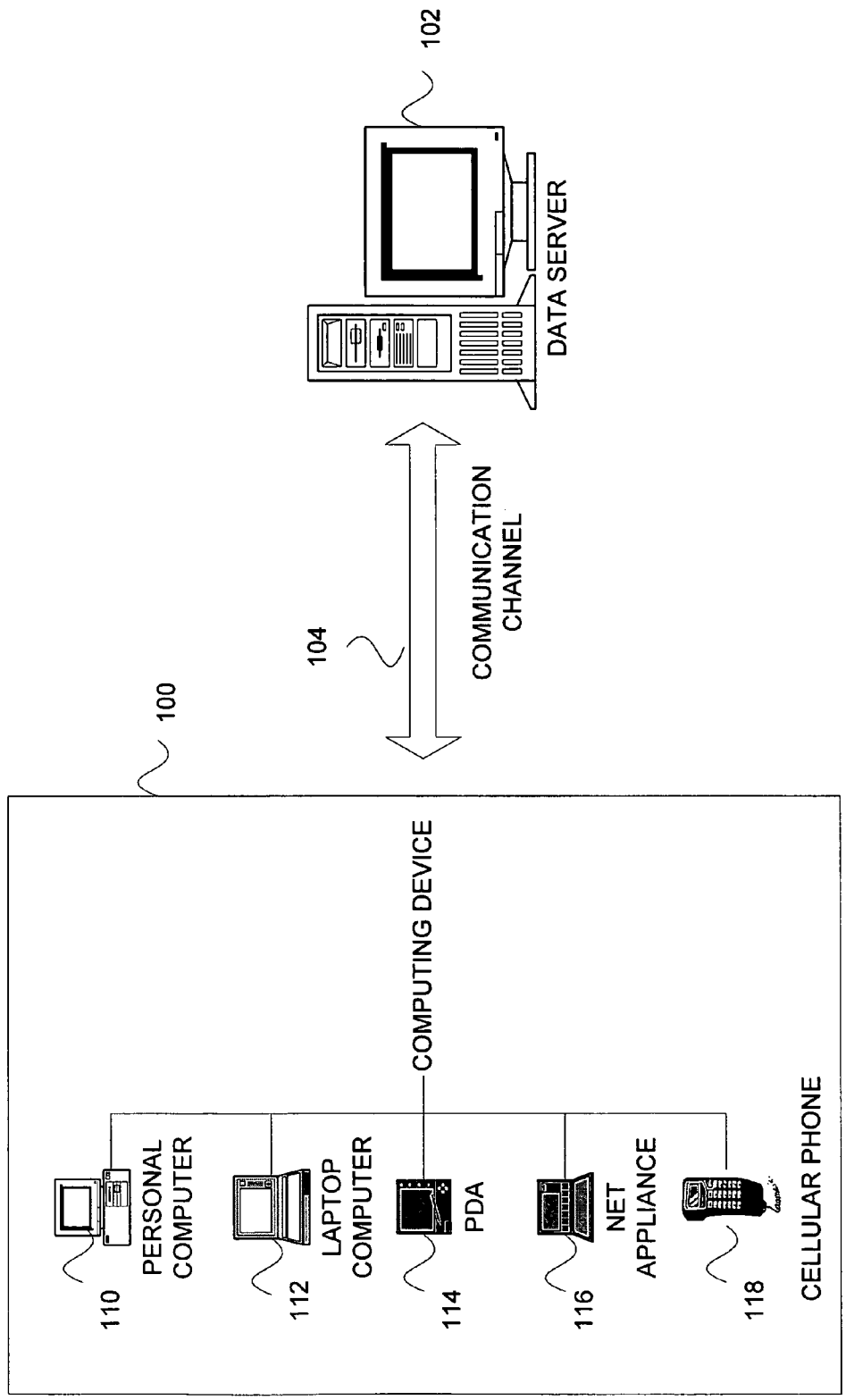
FIG. 1 illustrates a simplified diagram of a system in accordance with the preferred embodiment of the present invention.

The present invention will now be described in greater detail, which may serve to further the understanding of the preferred embodiments of the present invention. As described elsewhere herein, various refinements and substitutions of the various embodiments are possible based on the principles and teachings herein.

The preferred embodiments of the present invention will now be described with reference to FIGS. 1-7, wherein like components and steps are designated by like reference numerals throughout the various figures. Further, specific parameters such as computing devices, languages, mapping techniques, data layout, and the like provided herein are intended to be explanatory rather than limiting.

The present invention allows a user to create and edit documents and messages on a computing device that may not have been configured a priori or have limited storage capability to support the entire data set required for creating the documents or messages in a specific language. The computing device is required to communicate with a data storage device to dynamically load the required data from therein. In other words, the computing device loads the required data in response to user input when such data is not found on the computing device. The present invention also allows the computing device to manage the data stored therein based on the user inputs and the characteristics of the computing device.

In operation, the computing device initializes itself with initialization data. As the user inputs more text as part of the document or message, the computing device determines if it has the required data loaded therein to create and display the document or message. If the computing device does not have the required data, it communicates with a data storage device via a communication channel to load the required data into the device. Optionally and occasionally, the computing device may discard unnecessary data that it had previously loaded if it no longer required. In this manner, computing devices with limited memory capability can create documents and messages using fonts that represents hundreds of kilobytes or megabytes. This is especially relevant for devices with very small amount of memory capacity such as cellular telephones and pagers and for use with languages having very large font repertoire like Chinese and Japanese, which contain tens of thousands of characters. In a particular context such as the Internet, the present invention preserves the bandwidth used on the network by not loading a large amount of data and limiting it to what is required.

FIG. 1 illustrates a simplified diagram of a system in accordance with the preferred embodiment of the present invention. The system includes a computing device 100 that is capable of communicating with a data server 102 via a communication channel 104. The data server 102 can be any data storage device that is capable of storing data, fonts, or other information that are required by the computing device to create and edit documents and messages in any language. The data server 102 can be a web server located in a remote location and connected via a network to the computing device 100. Alternatively, the data server 102 or storage device can be placed within the computing device 100 as a hard disk, a flash memory, or the like. The communication channel 104 can be hard-wire, xDSL, ISDN, analog, cable, frame relay, wireless, etc., via a communication network such as the Internet, Intranet, etc. The computing device 100 can be a personal computer 110, laptop computer 112, PDA 114, Net appliance 116, cellular telephone 118, and the like. It is understood that any computing device (those illustrated and not illustrated) can be used in the present invention.

Figure 2:
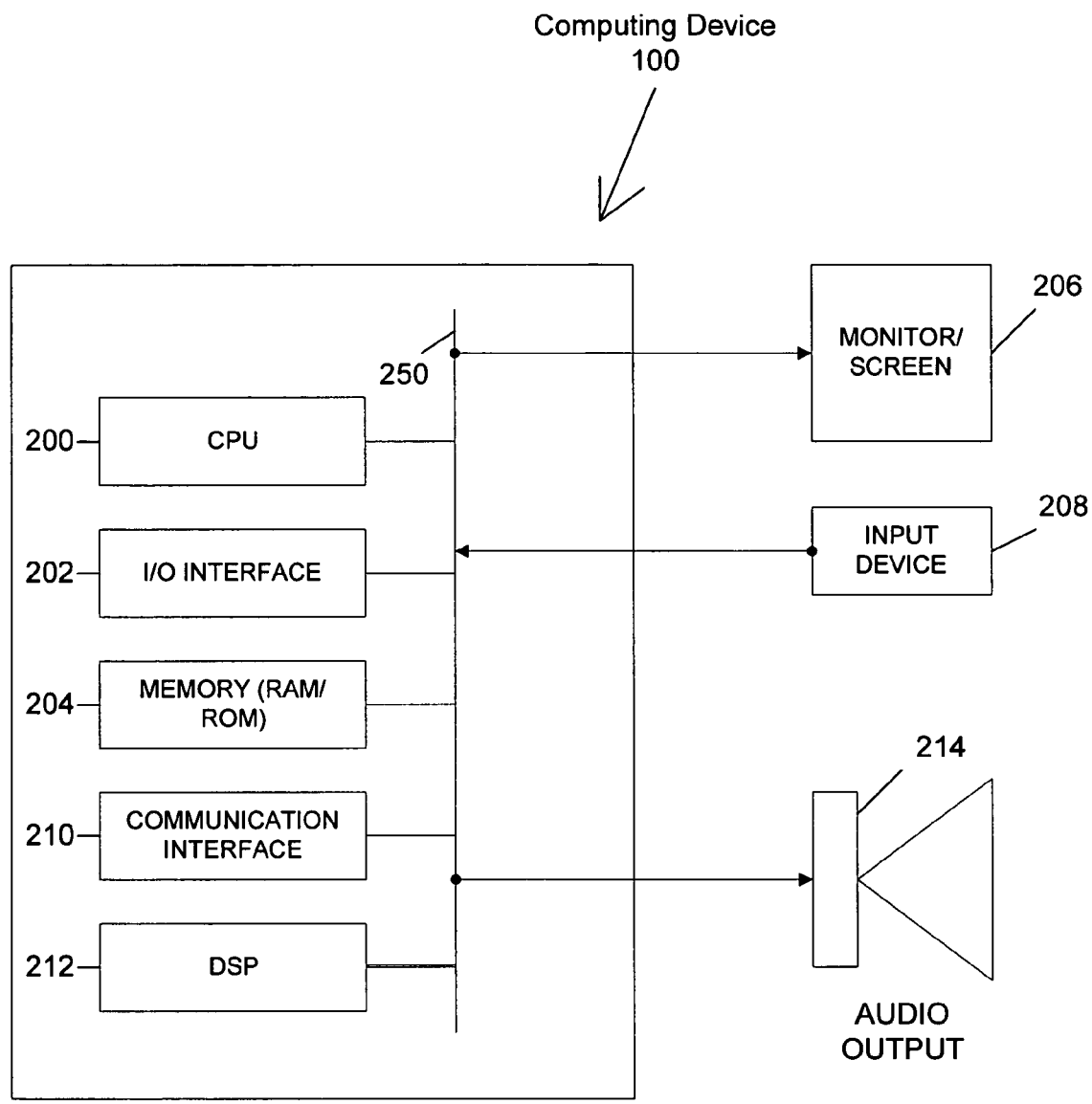
FIG. 2 illustrates a block diagram of a computing device in accordance with the preferred embodiment of the present invention.

FIG. 2 illustrates a block diagram of a computing device in accordance with the preferred embodiment of the present invention. The computing device 100 (i.e., a personal computer 110, laptop computer 112, PDA 114, Net appliance 116, cellular telephone 118) includes a CPU (central processing unit) 200 connected to a bus 250 for processing the computing tasks required for creating/editing a document or message ("document"). The computing device 100 also includes an I/O (In/Out) interface 202 and a local memory 204 for storing a limited amount of font, glyph, mapping information and other data required for creating/editing the document. Further connected to the bus 250 is a monitor/screen 206 that displays all or part of the document, as it is being created/edited. An input device 208 is also connected to the bus 250 for enabling the user to input text into the computing device 100. The input device 208 may support one or more of many input modalities including a keyboard, a pointing device, a mouse, and microphone. The computing device 100 further includes a communication interface 210 coupled to the bus 250, where the communication interface 210 is used to transmit/receive data to/from the data server 100 via the communication channel 104.

The computing device 100 may also include an audio DSP (digital signal processor) 212 for processing audio signals. When the input device 208 is a microphone, the DSP 212 processes the digital signals that were converted from the analog voice signals. The computing device 100 may include an audio output 214 such as a speaker so that the document can be presented to the user in audio form. The audio output 214 can be implemented internally and/or externally with the computing device 100. In addition, other components, which are not illustrated herein, but which are commonly used in computing devices may also be included therein. Certain of these components can be implemented in different ways. For example, while the audio DSP 212 that is realized from separate hardware may be used, the same functionalities can be achieved through software (i.e., software in browsers and sound chip in the computing device) that is processed by the CPU 200. The functional components described herein are preferably implemented through application software that is processed by the CPU 200 and/or DSP 212. Those of ordinary skill in the art will recognize other combinations of hardware and software components.

Figure 3:
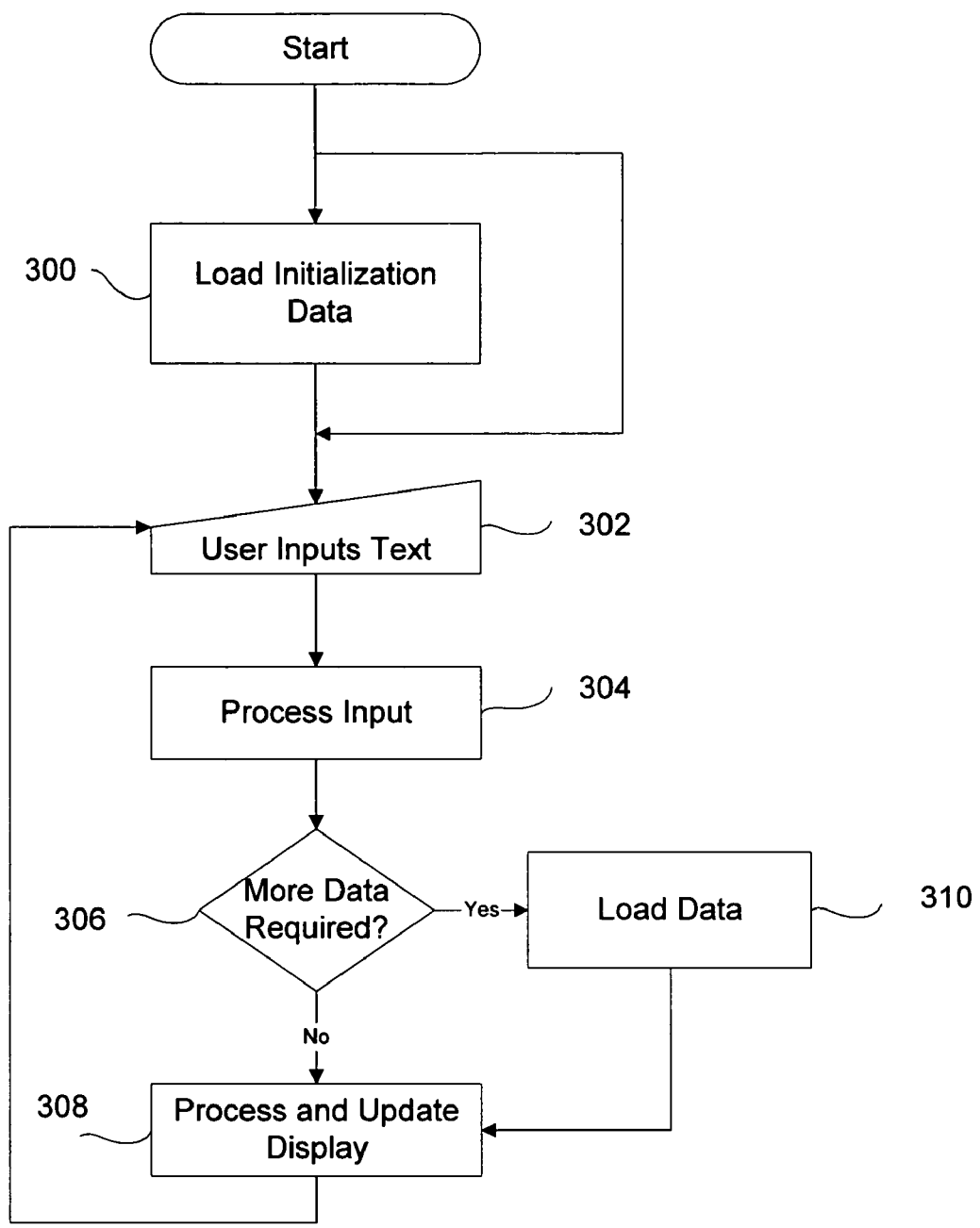
FIG. 3 illustrates a simplified flow diagram of the document creating process in accordance with the preferred embodiment of the present invention.

FIG. 3 illustrates a simplified flow diagram of the document creating process in accordance with the preferred embodiment of the present invention. When the computing device 100 is booted up or turned on, a small amount of data is loaded therein to initialize the device 100 in step 300. The initialization data, which is described in greater detail later herein, can be loaded onto the computing device 100 from the data server 100 via the communication channel 104. Alternatively, the initialization step 300 may not be required if the initialization data has been previously loaded onto the computing device 100 during an earlier session.

Next, in step 302, the user inputs text into the computing device 100 using the input device 208. The computing device 100 then processes the text for displaying on the monitor/screen 206 and for creating the document in step 304. As the user inputs the text, the computing device 100 determines in step 306 if it has the required data loaded thereon to map the inputted text into appropriate characters for displaying on the monitor/screen 206 and for creating the document. In other words, the computing device 100 determines if the data loaded therein is sufficient for displaying and creating the document. If it is determined that more data is required in step 306, the computing device 100 communicates with the data server 102 and loads the required data therein in step 310. Otherwise, it if is determined that the computing device 100 has the required data in step 306, no additional data is retrieved from the data server 102. Thereafter, in step 308, the computing device 100 continues to process the inputted text and displays the text on the monitor/screen 206 and creates the document. This process is repeated for additional user input in step 302.

Figure 4:
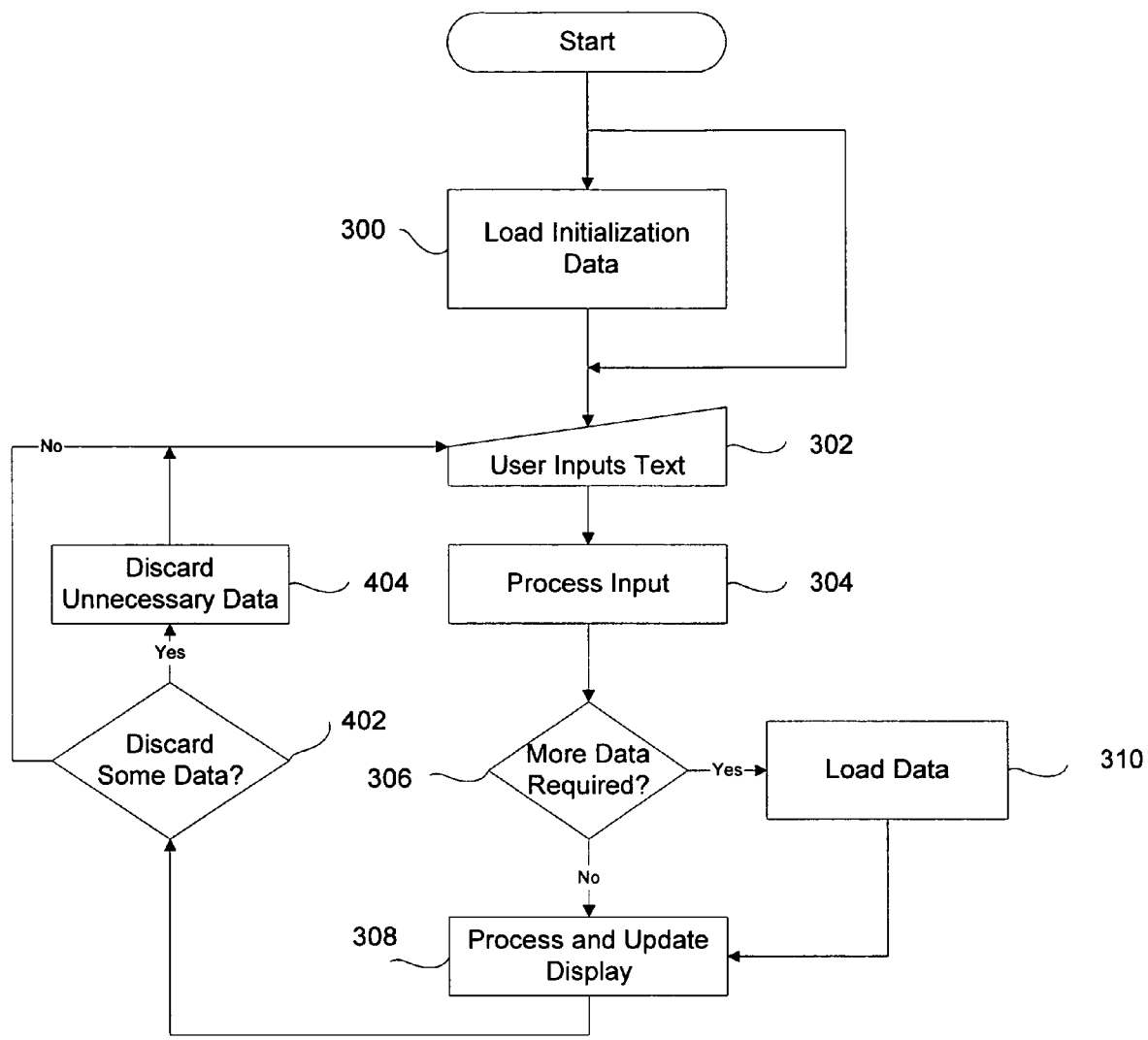
FIG. 4 illustrates a flow diagram of FIG. 3 with an optional optimization process for discarding unnecessary data in accordance with the preferred embodiment of the present invention.

In the process described above, those skilled in the art will appreciate that other optimization processes such as running multiple processes in parallel can be performed and are contemplated to be within the scope and spirit of the present invention. For example, FIG. 4 illustrates a flow diagram of FIG. 3 with an optional optimization process for discarding unnecessary data in accordance with the preferred embodiment of the present invention. In addition to the processes described in reference to FIG. 3, a data removal process (i.e., cache cleanup process) can be implemented where data that had been previously stored and used, but is no longer required, are removed from the computing device 100. As part of this optimization process, after step 308, it is determined whether some data stored in the computing device 100 can be removed from the memory 204 in step 402. If some data can be removed from the computing device 100 since such data is no longer required, this data is removed in step 404. When such data is removed, the computer device memory 204 can be used in the most optimal manner. This is an important process when the computing device has limited memory capacity.

Figure 5:
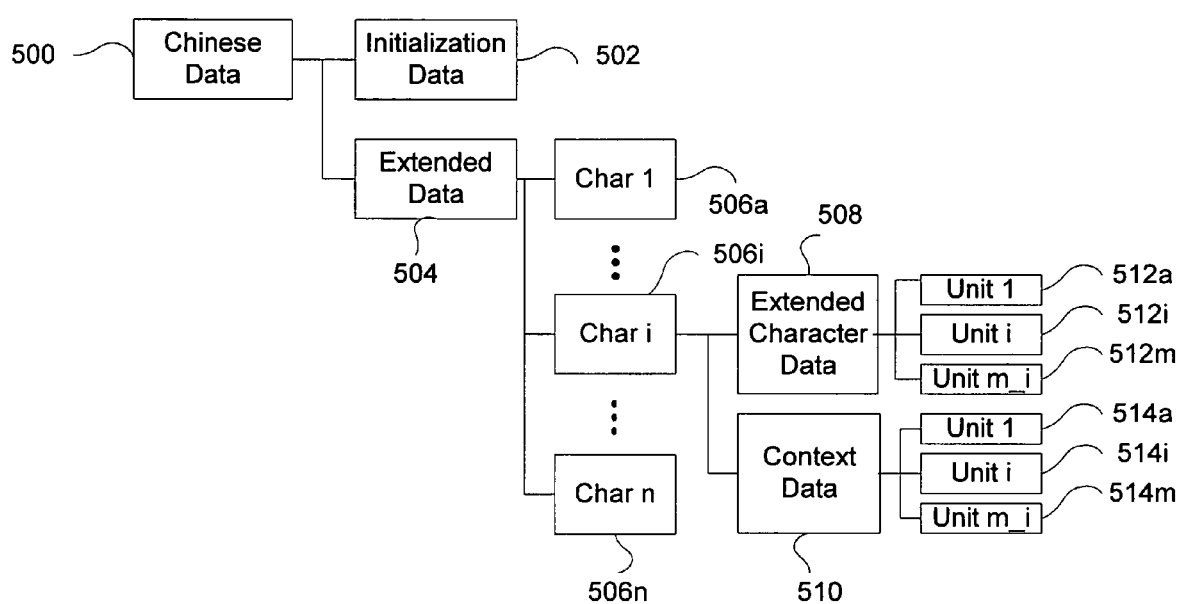
FIG. 5 illustrates the data layout for a specific language in accordance with the preferred embodiment of the present invention.

FIG. 5 illustrates the data layout for a specific language in accordance with the preferred embodiment of the present invention. In this example and for a more complete understanding of the present invention, FIGS. 5-6 will be described with the assumption that the computing device 100 has no Chinese data loaded a priori and the user desires to create a document in Chinese language. However, a portion of the data may be pre-loaded or pre-installed into the computing device 100 for bandwidth optimization. For example, in the case where no data is preloaded, all data are loaded to the computing device 100 as the user inputs text. However, if it is known a priori that the computing device 100 will be used primarily or frequently for creating documents in Chinese, a portion of the data for creating documents in Chinese can be preloaded on the computing device 100. Then, as the user inputs text to create documents in Chinese, less data needs to be downloaded from the data server 102. The amount of data, including no data, loaded a priori can be adjusted according to the memory capacity of the computing device 100. In the data server 102, data is arranged in a hierarchical fashion allowing the user to perform complex text drafting/editing on the computing device 100 as the data is dynamically downloaded from the data server 102. In addition, at each level, data is set up with sufficient granularity so that a small amount of data can be periodically or sequentially loaded onto the computing device 100 as the user creates the document.

In greater detail, the entire data 500 can be categorized into the initialization data 502 and extended data 504. As described above, the initialization data 502 is downloaded at the outset of the creating/editing process, while portions of the extended data 504 are dynamically downloaded as the document is being created. For example, in creating a Chinese document, the input methodology is assumed to be a phonetic input in Romanized form. That is, the user inputs the Romanized form of Chinese characters and the computing device 100 converts this form into Chinese characters. For instance, one of the Chinese characters "ni" (as in "ni hao") in Romanized form will create the Chinese character 你. This particular representation is one of about 40 characters such as 尼, 倪, 拟, 泥, 逆 that represent "ni". It is well known that some of these characters are used more frequently in documents. Accordingly, when the user inputs "ni", the Chinese characters are displayed and/or downloaded in the order of usage frequency and popularity. In other words, the more commonly used characters are displayed and/or downloaded first. The particular order in which the characters are downloaded can be tuned to the application at hand and does not necessarily have to be by usage frequency.

These characters are grouped in multiple data units that can be sequentially or periodically downloaded for displaying to the user. For example, the user can view each data unit to determine if the desired character is within such unit. If the desired character is not within the data unit, additional data units corresponding to the phonetic token are downloaded to the computing device 100. This process is repeated until the user locates the desired character from one of the data units. As can be expected, the number of data units can vary depending on the number of data units, downloading time/bandwidth, and the size of each data unit. In the present example, the extended data 504 is composed of the first data units 506*a*, 506*i*, 506*n*, which itself is composed of extended character data 508 and context data 510. The extended character data 508 is further composed of second data units 512*a*, 512*i*, 512*m*, while the context data 510 is composed of third data units 514*a*, 514*i*, 514*m*.

In addition to the extended character data 508, it is possible to store other data or information providing more functionality. For the Chinese language, data is provided for each character that assists in narrowing down the selection based on the context in which the character is used. For example, the character "ni" can have any of the above 40 or so representations, but when it is used next to "hao" as in "ni hao", only the representation 你 is accurate. The application, given the contextual data for the characters, determines and automatically selects one unique usage of the "ni". To determine this unique combination, the application requires information encoding this context, which information is stored in the context data 510.

Although the above embodiment for representing data uses certain number of data units and corresponding sizes, those skilled in the art will readily appreciate that many modifications of the exemplary embodiments are possible without materially departing from the novel teachings and advantages of this invention. These include, but are not limited to, changing the number of the data units, size of the data units, the number of levels in which these data units are arranged and relative order of the loading of these units. In particular, the data arrangement for simpler languages other than Chinese such as English, Hindi, Persian, Tamil generally involves fewer levels.

Figure 6:
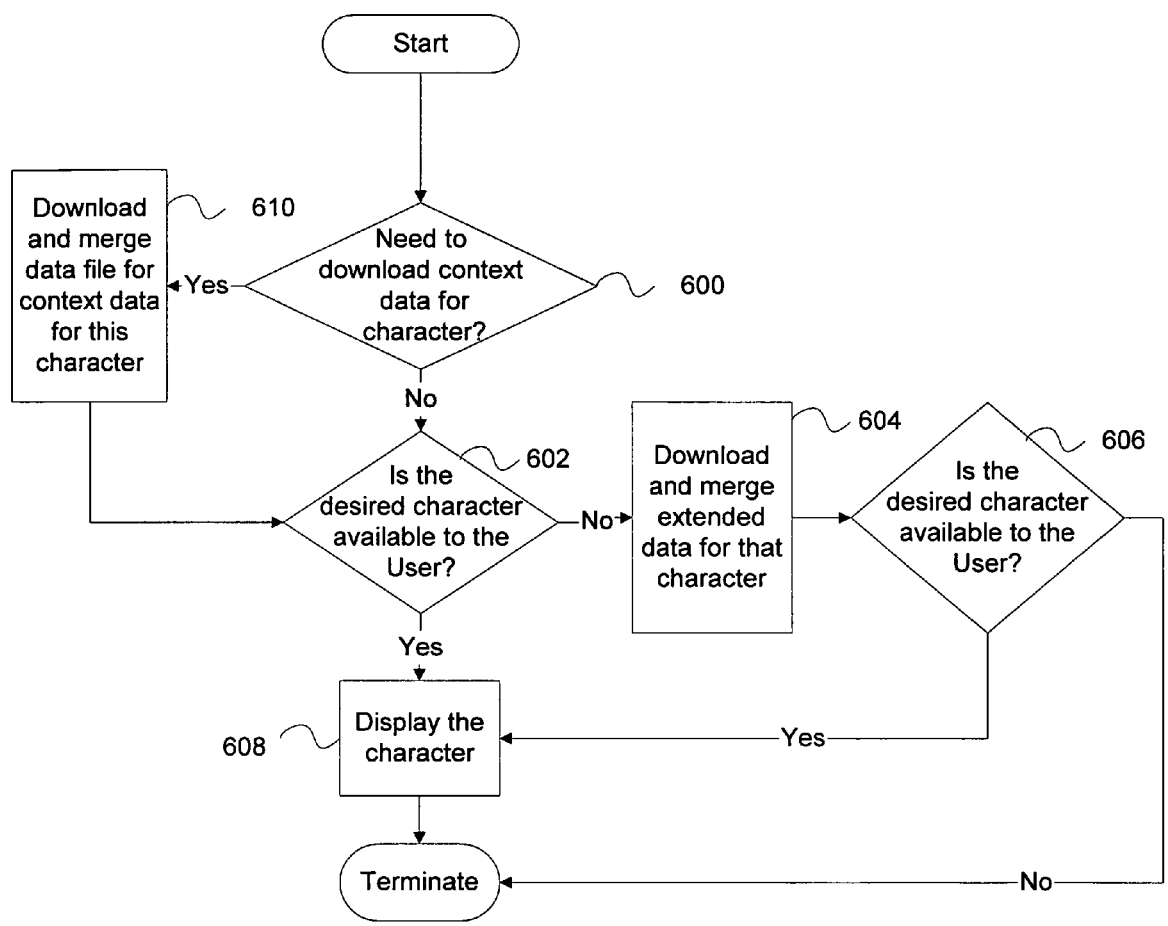
FIG. 6 illustrates a flow diagram for downloading characters from a data server to a computing device in accordance with the preferred embodiment of the present invention.

FIG. 6 illustrates a flow diagram for downloading characters from a data server to a computing device in accordance with the preferred embodiment of the present invention. The flow chart of FIG. 6 describes the process that is used to load additional data into the computing device 100 during the document creation process. As described above, the document creation process begins by initializing the system. At the outset, some initialization data 502 are downloaded. As the user continues to input additional text, more data is downloaded and merged with the existing data on the computing device 100 according to the algorithm. For example, as the user types the character "n" in "ni" the present algorithm runs. Thereafter, when the user types the next character "i", the algorithm runs again, and this process is repeated.

As illustrated in the flow diagram, as the user inputs a character, it is determined whether context data 510 for a particular character needs to be downloaded from the data server 102 to the computing device 100 in step 600. If it is determined that the data needs to be downloaded in step 600, appropriate unit(s) 514a, 514i, 514m of the context data 510 are downloaded and merged with the data residing on the computing device 100 in step 610. In other words, the context data 510 is merged with the data that was either a part of the initialization data 502 or was downloaded in a previous execution of during this process. The relevant characters (for user input) are then displayed to the user for selection in same step 610. Next, in step 602, it is determined whether the desired character is available to the user, that is, the user selects one of the characters from the various characters presented to him/her. If the user locates the desired character in step 602, the user has selected the character that he/she desires to display in response to the user's input and that character is displayed as part of the user's document in step 608. If, however, the character is not available, then the appropriate units 512a, 512i, 512m of the extended character data 508 are downloaded and merged with the existing data on the computing device 100 in step 604. If the user now locates the character needed in step 606 based on the merged units 512a, 512i, 512m, that character is selected for the document and displayed in step 608. If, however, the character is not found in step 606, the display character selection process terminates. Then, when the user performs the nest input operation, this algorithm is activated to determine if the input can map to the display characters and what characters should be displayed.

As noted above, the size of the data quantum loaded into the computing device 100 and the frequency of such transactions can be varied to accommodate the design characteristics and memory capacity of the device 100 and the communication channel 104. For example, a cellular telephone that has limited memory capacity can be connected to the network in a continuously manner or "on demand" using the application running on the device. Examples of such devices are data enabled cellular telephones, two way pagers such as the one from Research In Motion, Inc. (RIM) and hand held devices like the PALM devices from 3COM Corporation. The data quantum can then be reduced to a single glyph and a single contextual data information.

Figure 7:
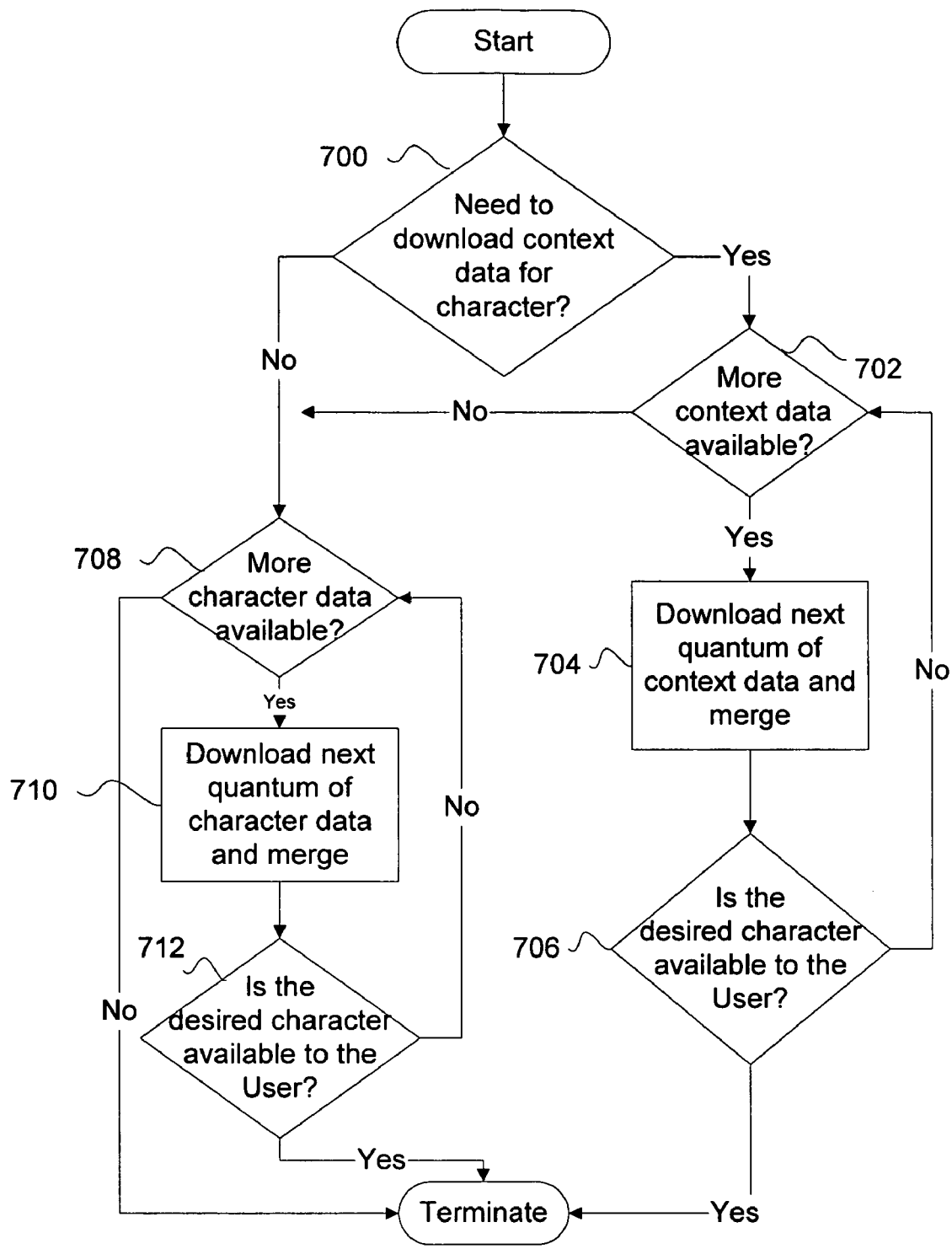
FIG. 7 illustrates a flow diagram for loading data onto a computing device in response to a user input in accordance with the preferred embodiment of the present invention.

FIG. 7 illustrates a flow diagram for loading data to the computing device in response to user input. In step 700, it is determined if context data 510 needs to be downloaded for the character. If the data is needed and there is more context data 510 available on the data server 102, the first quantum of context data 510 is downloaded and merged into the data in the application in step 704. If, after this merger, the desired character is available to the user in step 706, the data downloading process for this character terminates. If, however, the desired character is not available, the process repeats itself from in step 702.

If all the context data 510 has been loaded or no additional context data is needed from the data server 102 in step 702, it is determined whether more extended character data 508 is available in step 708. If more extended character data 508 exists in step 708, the next quantum of the extended character data 508 is downloaded and merged in step 710. If, after this merger, the desired character is available to the user in step 712, the data downloading process for this character terminates. Otherwise, if the desired character is not available in step 712, the process repeats itself in step 708. If no more relevant data remains in step 708, then there has been an error and the process terminates in an error. Although in the above embodiment the context data 510 is downloaded before downloading the extended character data 508, in other embodiments, the context data 510 and the extended character data 508 can be downloaded simultaneously, or only one data type or a mix of the data type can be downloaded.

With the fine level of granularity, the present invention enables computing devices such as cellular telephones and pagers to augment the data required to create a document or message even to a granularity of a key press. That is, as the user inputs each key, the application can dynamically load data, thereby providing complex functionality with very limited memory capacity on the device.

In the previous descriptions, numerous specific details are set forth, such as specific functions, components, etc., to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

I claim:

1. A method of creating a document on a computing device, comprising:
  initializing the computing device with a portion of font data for a particular language, the portion including less than all of the font data for the particular language;
  receiving input text in the computing device to initiate the document creation process;
  based on the input text, determining whether the portion of the font data is sufficient to create the document on the computing device; and
  loading a further portion of the font data to the computing device from a data storage location if the computing device cannot create the document with the portion of the font data, wherein the further portion of the font data alone or in combination with the portion of the font data are used to create the document.

2. A method according to claim 1 further comprising discarding undesired data from the computing device after creating the document.

3. A method according to claim 1 further comprising dynamically loading the further portion of the font data during the text inputting step.

4. A method according to claim 1 further comprising inputting text in a first language and loading the further portion of the font data that corresponds to a second language.

5. A method according to claim 4 further comprising displaying the document on a monitor in the second language.

6. A method according to claim 4, wherein the first language comprises a Roman language and the second language comprises a non-Roman language.

7. A method according to claim 4, wherein the first language comprises a non-Roman language and the second language comprises a Roman language.

8. A method according to claim 4, wherein the first language comprises English and the second language comprises non-English.

9. A method of creating an electronic document on a computing device, comprising:
  receiving input text in the computing device;

based on the input text, determining whether the computing device has a portion of font data for a particular language stored therein to create the document, the portion including less than all of the font data for the particular language and if so, creating the document for displaying the input text;

downloading a further portion of the font data from a data storage location when the computing device does not have the font data stored therein to create the document; and creating the document using at least the further portion of the font data, wherein the document allows for the display of the input text.

10. A method according to claim 9, wherein the downloading the further portion of the font data is performed in a sequential manner.

11. A method according to claim 9, wherein the downloading the further portion of the font data is performed in a periodical manner.

12. A method according to claim 9 further comprising discarding undesired data form the computing device after creating the document.

13. A method according to claim 9 further comprising dynamically downloading the further portion of the font data during the text inputting step.

14. A method according to claim 9 further comprising inputting text using a first language and downloading the further portion of the font data that corresponds to a second language.

15. A method according to claim 14 further comprising displaying the document on a monitor in the second language.

16. A method according to claim 14, wherein the first language comprises a Roman language and the second language non-Roman language.

17. A method according to claim 14, wherein the first language comprises a non-Roman language and the second language Roman language.

18. A method according to claim 14, wherein the first language comprises English and the second language comprises non-English.

19. A method of creating a document on a computing device comprising:

receiving input text in the computing device to initiate the document creation process;

based on the input text, determining whether a portion of font data for a particular language, to create the document on the computing device is loaded, wherein displaying the document includes displaying the input text; and loading a further portion of the font data to the computing device from a data storage location if the computing device cannot create the document with the portion of the font data, wherein the further portion of the font data alone or in combination with the portion of the font data are used to create the document, wherein the document allows for the display of the input text.

* * * * *